(12) United States Patent
Routeau et al.

(10) Patent No.: US 7,771,245 B2
(45) Date of Patent: Aug. 10, 2010

(54) ASSEMBLY OF BUOYS FOR FLEXIBLE SUBMARINE PIPE

(75) Inventors: Sylvain Routeau, Saint Cloud (FR); Jacques Millet, Paris (FR)

(73) Assignee: Technip France (FR)

( * ) Notice: Subject to any disclaimer, the term of this patent is extended or adjusted under 35 U.S.C. 154(b) by 189 days.

(21) Appl. No.: 12/094,887

(22) PCT Filed: Nov. 24, 2006

(86) PCT No.: PCT/FR2006/002586

§ 371 (c)(1),
(2), (4) Date: May 23, 2008

(87) PCT Pub. No.: WO2007/060335

PCT Pub. Date: May 31, 2007

(65) Prior Publication Data

US 2008/0274656 A1 Nov. 6, 2008

(30) Foreign Application Priority Data

Nov. 28, 2005 (FR) .................................. 05 12017

(51) Int. Cl.
*B63B 22/00* (2006.01)
*B63B 51/02* (2006.01)
(52) U.S. Cl. ...................................... 441/133
(58) Field of Classification Search ................. 441/133
See application file for complete search history.

(56) References Cited

U.S. PATENT DOCUMENTS

| | | | | |
|---|---|---|---|---|
| 2,395,892 A * | 3/1946 | Lontz | ........................ | 441/133 |
| 3,214,921 A * | 11/1965 | Goepfert et al. | .......... | 405/168.3 |
| 3,332,093 A * | 7/1967 | Skinner et al. | .............. | 441/133 |
| 3,489,182 A * | 1/1970 | Cameron | .................... | 138/103 |
| 3,594,835 A | 7/1971 | Wilson | | |
| 3,597,779 A * | 8/1971 | Morgan | ...................... | 441/133 |
| 3,705,432 A * | 12/1972 | Watkins, Jr. | ................ | 441/133 |
| 3,729,756 A * | 5/1973 | Cook et al. | ................. | 441/133 |
| 3,992,735 A * | 11/1976 | McCarthy | ................... | 441/133 |
| 4,065,822 A | 1/1978 | Wilbourn | | |

(Continued)

FOREIGN PATENT DOCUMENTS

GB 1 268 232 3/1972

(Continued)

OTHER PUBLICATIONS

International Search Report dated Apr. 26, 2007 issued in corresponding PCT Application No. PCT/FR2006/002586.

(Continued)

*Primary Examiner*—Daniel V Venne
(74) *Attorney, Agent, or Firm*—Ostrolenk Faber LLP

(57) ABSTRACT

An assembly of support buoys for a flexible submarine pipeline which is designed for the transport of hydrocarbons. A plurality of buoys which can be installed gradually on at least one portion of the flexible submarine pipeline. A fixing device blocks translational movement of the buoys on the portion of the pipeline. The fixing device includes a hitching or coupling line which connects each of the buoys successively to one another. The translational movement of each of the buoys is gradually blocked on the coupling line. Connecting devices maintain the coupling line taut at locations along the portion of the pipeline.

10 Claims, 1 Drawing Sheet

U.S. PATENT DOCUMENTS

| | | | |
|---|---|---|---|
| 4,386,919 A * | 6/1983 | Kadono | 441/133 |
| 4,506,622 A * | 3/1985 | Linehan et al. | 114/230.2 |
| D329,486 S * | 9/1992 | Park | D21/803 |
| 5,197,912 A * | 3/1993 | Lengefeld | 441/133 |
| 5,330,378 A * | 7/1994 | Park | 441/133 |
| 5,711,639 A * | 1/1998 | Tessier et al. | 405/171 |
| 6,270,387 B1 | 8/2001 | Nesheim | |
| 7,100,641 B2 * | 9/2006 | Tyrer et al. | 138/110 |
| 7,383,885 B2 * | 6/2008 | Bergeron et al. | 166/345 |

FOREIGN PATENT DOCUMENTS

| | | |
|---|---|---|
| GB | 2 309 576 | 7/1997 |

OTHER PUBLICATIONS

International Preliminary Examination Report issued in corresponding PCT Application No. PCT/FR2006/002586.

* cited by examiner

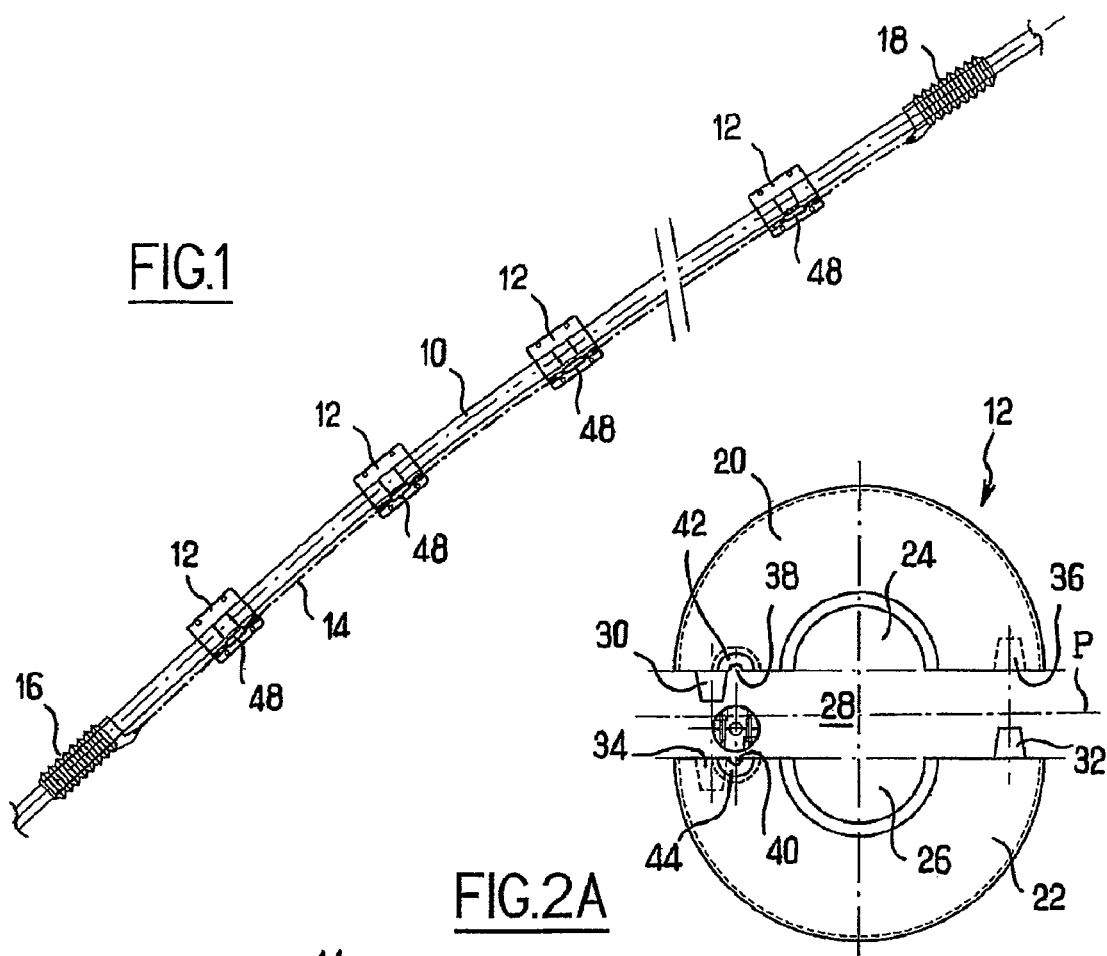
FIG.1
FIG.2A
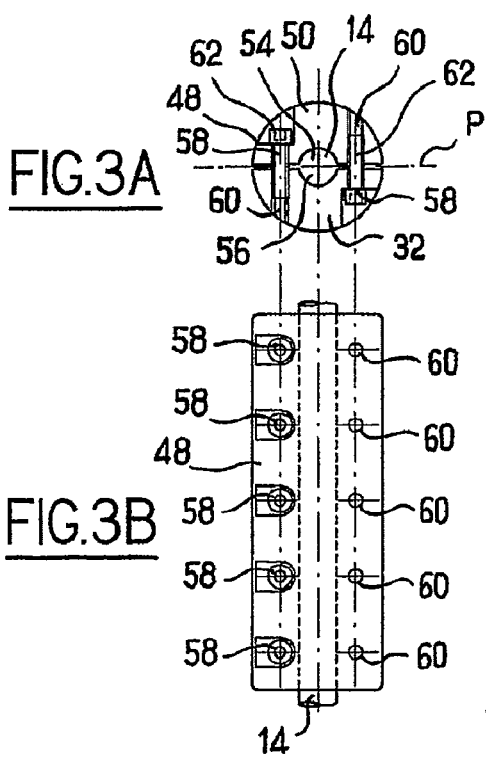
FIG.3A
FIG.3B
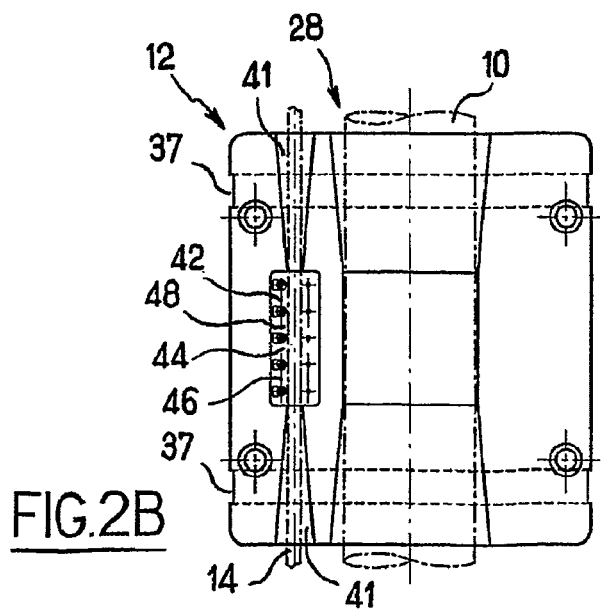
FIG.2B

ASSEMBLY OF BUOYS FOR FLEXIBLE SUBMARINE PIPE

CROSS-REFERENCE TO RELATED APPLICATIONS

The present application is a 35 U.S.C. §§371 national phase conversion of PCT/FR2006/002586, filed Nov. 24, 2006, which claims priority of French Patent Application No. 05/12017, filed Nov. 28, 2005, the disclosure of which has been incorporated herein by reference. The PCT International Application was published in the French language.

BACKGROUND OF THE INVENTION

The present invention relates to a set of floaters or buoys for flexible submarine pipes.

These submarine pipes are intended for the transport of hydrocarbons. The pipes are generally spaced out in the form of a catenary between a sea floor installation and a surface installation.

In deep water, when the sea floor and the surface are very far apart, submarine pipes are subjected to considerable tensile forces which are limited in part by the presence of buoys or floaters. These buoys are generally installed one after the other on selected sections of the submarine pipe and are maintained in position by clamps around the pipe, in such a way as to absorb at least a part of the tensile forces which act on the pipe and, by the same token, on the surface installation.

U.S. Pat. No. 6,270,387 describes a buoy or floater formed from a cylindrical sleeve in two parts. The sleeve has a central transcurrent hole to permit the passage of the pipe, and the sleeve is split in the axial direction to form two parts which are joined together in relation to each other around a generating line of the cylindrical form. A clamp is divided into two half-clamps that are respectively immovably attached to the two sleeve parts and are intended to be connected to each other so as to cause the two sleeve parts to be locked together and around the submarine pipe. These sleeves are mutually independent, and they are fitted on the section of the pipe in conjunction with the installation of the latter between the sea floor installation and the surface installation.

One disadvantage associated with the fitting of these clamps around the submarine pipe lies in the fragility of the surface layers of the said pipe. In fact, these are covered with a soft foam isolation layer, and it is accordingly necessary to provide a more rigid insert in place of the foam at the point at which it is proposed to fit the clamp in such a way as to prevent compression of the foam, which would otherwise flow.

A further drawback associated with the above device is that the translational displacement of these floaters along the submarine pipe, for example in order to adjust the distribution of the tensile forces, and in the event that this may not have been sufficiently well evaluated, requires that submarine pipe be raised to the surface in order to readjust the positions of all the cylindrical sleeves. This operation requires at the very least that all the clamps be released, that each of the floaters is caused to slide one after the other towards a new section of the pipe, and that all the clamps are then retightened.

One problem which is encountered in this case, and which the present invention proposes to resolve, is to make available a set of buoys or floaters which permits reduction in the number of operations necessary for the displacement of the set of buoys or floaters along the submarine pipe and which consequently permits a reduction in the global intervention time.

SUMMARY OF THE INVENTION

With the intention of resolving the problem posed above, the present invention proposes a set of buoys or floaters for a flexible submarine pipe adapted for the transport of hydrocarbons. The said set of buoys or floaters comprises a plurality of buoys or floaters capable of being installed one after the other on at least one section of the flexible submarine pipe. The said set of buoys or floaters comprises securing devices enabling the floaters to be locked in the translational sense on the section of pipe. According to the invention, the said securing devices comprise: a hitching line connecting each of the buoys or floaters together, successively, each of the said buoys or floaters being maintained in position one after the other and being locked in the translational sense on the hitching line; and connecting devices for maintaining the hitching line extended along the section of the pipe. By this means, the buoys or floaters that make up the plurality of buoys or floaters are locked in the translational sense in relation to the section of pipe.

A characterizing feature of the invention thus resides in the provision of a hitching line, to which the buoys or floaters are attached one after the other, which floaters are locked in the translational sense on this hitching line. Furthermore, the connecting devices permit the hitching line, to which the floaters are immovably attached, to be maintained in position along the desired section of pipe. In this way, all that is required for the displacement of the set of buoys or floaters along the submarine pipe is to pull the hitching line in the translational sense, and the line itself then pulls along all the buoys or floaters, without having to remove each of the buoys or floaters and displacing them one by one along the pipe. Furthermore, there is no need to provide a more rigid insert on the pipe in the vicinity of each floater, as the latter is now attached in a sliding manner on the pipe and does not compress it. The installation of the rigid inserts according to the prior art, in positions to be determined at the moment of installation of the pipe, required manual operations and a longer downtime for that means of implementation.

According to one particularly advantageous mode of implementation of the invention, each of the buoys or floaters exhibits a central transcurrent hole adapted to receive the submarine pipe in a freely sliding manner. Each buoy or floater thus completely surrounds the pipe, which permits more effective distribution of the sustentation efforts on the pipe. Further, the pipe is mounted in a sliding manner in each of the buoys or floaters, such that the act of pulling the hitching line along the pipe permits the buoys or floaters to be slid on the pipe in a single operation.

Furthermore, and advantageously, each of the buoys or floaters exhibits a peripheral transcurrent hole. The hitching line passes through the buoys or floaters making up the plurality via the peripheral transcurrent hole so as to ensure more effective locking in the translational sense of each buoy or floater on the hitching line and, in conjunction with the displacement of the buoys or floaters along the pipe, so as to exert longitudinal tensile forces as close as possible to the central transcurrent hole in order to obtain better guiding of the buoys or floaters as they slide on the pipe.

According to one particular embodiment of the invention, each of the said floaters exhibits two separable semi-floaters that are mutually symmetrical in relation to an axial plane. The semi-floaters are adapted as to be capable of reassembly to form the floater. The central hole and the peripheral hole are divided respectively axially into two mutually symmetrical sections in relation to the axial plane. These include one section of each of the holes in one of the semi-floaters and another section in the other of the semi-floaters. Thus, when the semi-floaters are installed on the submarine pipe, the hitching line is secured simultaneously by being gripped in the buoys or floaters. The hitching line is preferably equipped with a plurality of locking sleeves adapted to hold it by force. Each of the locking sleeves is respectively gripped tightly in the interior of each of the buoys or floaters. The locking sleeves gripped tightly in the interior of the buoys or floaters thus constitute shoulders, which then come into abutment with the interiors of the floaters so as to lock the buoys or floaters in the translational sense in relation to the hitching line.

Each of the sleeves is divided advantageously into two separable semi-sleeves that are mutually symmetrical in relation to another axial plane. The semi-sleeves are equipped with threaded tightening elements for the purpose of holding the hitching line by force between the semi-sleeves. In this way, the position of the sleeves is adjustable and can be predetermined in order to adjust the distance between the buoys or floaters.

Moreover, at least two clamps which are adapted to be maintained locked in the translational sense around the submarine pipe, for example one at each of the extremities of the hitching line, include attachment devices permitting the hitching line to be extended along the submarine pipe and permitting the buoys or floaters to be maintained in a fixed position on the pipe and spaced at regular intervals.

Other characteristics and advantages of the invention will be appreciated from reading the following description of a particular embodiment of the invention, provided by way of information although not intended to be restrictive, with reference to the drawings attached hereto.

BRIEF DESCRIPTION OF THE DRAWINGS

FIG. 1 is a partial schematic view of a set of buoys or floaters according to the invention;

FIG. 2A is a schematic front view of a detail element illustrated in FIG. 1 and divided into two parts;

FIG. 2B is a schematic side view of the detail element illustrated in FIG. 2A;

FIG. 3A is a schematic view of another detail element illustrated in FIG. 2A;

FIG. 3B is a schematic side view of the said other detail element illustrated in FIG. 2B.

DESCRIPTION OF PREFERRED EMBODIMENTS

FIG. 1 depicts a section of flexible submarine pipe 10, intentionally truncated, which is adapted to extend between a sea floor installation and a surface installation that are not illustrated here. This section of submarine pipe 10 is equipped with a set of buoys or floaters 12. Four are shown in FIG. 1 in the interests of the clarity of the drawing, although they are considerably more numerous in reality. As explained in further detail below, each of the buoys or floaters 12 surrounds the pipe 10. The floaters are connected together successively by hitching line 14, for example in the form of a cable. This hitching line 14 is maintained extended along the pipe 10 due to the presence of two clamps 16, 18 locked in the translational sense on the pipe 10 to either side of the set of buoys or floaters 12.

Each buoy or floater 12 is connected in the translational sense to the hitching line 14, which itself is maintained in a fixed position along the pipe 10. The buoys or floaters 12 are thus locked in the translational sense on the pipe 10.

The construction of a floater 12 is now described with reference to FIGS. 2A and 2B. These floaters 12 are comprised of two semi-floaters 20, 22, which are mutually symmetrical in relation to an axial plane P and are assembled on the pipe to each form a cylindrical sleeve which encloses the pipe 10. This cylindrical sleeve exhibits a diameter between 1 and 1.5 m, for example, and a length that is between 1 and 2 m, for example.

The two semi-floaters 20, 22 in this case are executed in the form of a plastic material foam, although it is equally possible to produce semi-floaters formed from watertight casings, for example made of steel.

The two semi-floaters 20, 22 exhibit initial axial hollows 24, 26 forming U-shaped grooves, arranged facing one another and so adapted as to form a central transcurrent hole 28 having an essentially circular symmetry when the two semi-floaters 20, 22 are assembled. The central transcurrent hole 28 thus permits the passage of the pipe 10. Furthermore, the two semi-floaters 20, 22 respectively include center pins 30, 32 oriented essentially perpendicularly to the axial plane P and which are so adapted as to engage in corresponding holes 34, 36 in such a way as to align the axial hollows 24, 26 perfectly so that they form the central transcurrent hole 28 with a predetermined circular symmetry. The flexible submarine pipe 10 can thus be installed in such a way as to slide in the interior of the floaters 12. Furthermore, the two semi-floaters 20, 22 respectively have peripheral grooves 37 able to meet exactly and which are adapted to receive a peripheral clamp in order to hold the two semi-floaters 20, 22 together. In this way, the buoys or floaters are no longer directly attached to a clamp holding the submarine pipe directly, which protects this pipe from the stresses exerted by the clamps that are used customarily.

It should also be noted that the assembly of these two semi-floaters 20, 22 to form the buoys or floaters 12 on the submarine pipe 10 is more simple and, as a result, more economical than the assembly of the buoys or floaters according to the prior art.

Moreover, the two semi-floaters 20, 22 include second longitudinal peripheral hollows 38, 40 similarly forming U-shaped grooves, which extend respectively and essentially parallel to the axial hollows 24, 26 and face one another symmetrically in relation to the axial plane P in order, when the two semi-floaters 20, 22 are reassembled, to form a single peripheral transcurrent hole 41 essentially parallel to the central transcurrent hole in order to receive the hitching line 14.

Furthermore, the second peripheral hollows 38, 40 include, at a point mid-way between their extremities which discharge to the exterior, and respectively in each of the two semi-floaters 20, 22, opposing enlargements 42, 44 that are symmetrical mutually and also in relation to the axial plane P. These opposing enlargements 42, 44 are so adapted as to form a cavity 46 to accommodate a locking sleeve 48, which is crimped or held by force on the hitching line 14. This locking sleeve 48 is gripped tightly inside the cavity 46 when the two semi-floaters 20, 22 are assembled. As a consequence, as soon as the locking sleeve 48 grips the hitching line 14, the line is locked in the translational sense in the peripheral transcurrent hole 41.

The locking sleeve 48, which is maintained gripped and in a fixed position on the hitching line 14, is depicted in detail in FIGS. 3A and 3B. This locking sleeve 48 is divided axially into two semi-sleeves 50, 52 that are mutually symmetrical in relation to another axial plane P', and they include two axial grooves 54, 56, facing one another respectively in each of the two semi-sleeves 50, 52. These axial grooves 54, 56 are adapted to receive the hitching line 14. Moreover, each of the two semi-sleeves 50, 52 has a series of orifices 58 on one side of the axial groove, and a series of tappings 60 on the other side, which penetrate essentially perpendicularly to the other axial plane P' such that the orifices 58 of one of the semi-sleeves 50 correspond to the tappings 60 of the other semi-sleeve 52, whereas the orifices 58 of the other semi-sleeve 52 correspond to the tappings 60 of the one sleeve 50. A threaded device 62 is adapted as to engage in each of the orifices 58 and to be screwed by force into the tapping 60 corresponding thereto, in order to cause the hitching line 14 to be gripped firmly between the two semi-sleeves 50, 52. Thus, the locking sleeves are maintained and locked in the translational sense on the hitching line 14.

Referring to FIG. 1, the locking sleeves 48 are integral with the hitching line 14 in the translational sense, and the locking sleeves 48 are integral with the buoys or floaters 12 in the translational sense and are spaced at regular intervals in relation to one another. The extension of the hitching line 14 and its maintenance in a fixed position along the flexible pipe 10 permits each of the buoys or floaters 12 to be maintained in a fixed position in relation to the pipe 10 and to be spaced essentially at regular intervals in relation to one another along the pipe 10. Furthermore, if it is wished to displace the set of floaters 12 longitudinally along the flexible pipe 10, all that is required for this purpose is to release the two clamps 16, 18 at each of the extremities of the hitching line 14 and to pull the hitching line 14 in the translational sense in one direction or in an opposite direction, in conjunction with which the buoys or floaters 12 will slide freely along the pipe 10.

The invention claimed is:

1. An assembly of buoys or floaters for a flexible submarine pipe, the assembly comprising
   a plurality of buoys or floaters installable one after the other on at least one section of the flexible submarine pipe:
   securing apparatus configured and operable for securing the buoys or floaters in the translational sense on the section of pipe, the securing apparatus comprising
   a hitching line connecting all of the buoys or floaters, the buoys or floaters being secured in the translational sense on the hitching line for maintaining the buoys or floaters in positions one after the other on the hitching line; and
   connecting devices configured for maintaining the hitching line extended along the section of pipe, whereby the buoys or floaters secured on the hitching line are secured in the translational sense in relation to the section of pipe;
   each of the buoys or floaters has a first transcurrent hole therethrough to receive the flexible submarine pipe in a freely sliding manner, and each buoy or floater thereby completely surrounding the pipe;
   each of the buoys or floaters includes a second peripheral transcurrent hole, the hitching line passing through the buoys or floaters via the second peripheral transcurrent holes thereof;
   each of the buoys or floaters is comprised of two separable semi-floaters that are mutually symmetrical in relation to an axial plane P, the semi-floaters being capable of reassembly to form the respective buoy or floater, the first transcurrent hole and the second peripheral transcurrent hole of each buoy or floater being divided respectively axially into two mutually symmetrical sections in relation to the axial plane P, with one section in one of the semi-floaters and another section in the other of the semi-floaters.

2. The assembly of floaters according to claim 1, further comprising a plurality of locking sleeves, each locking sleeve being capable of holding the hitching line by force, and each locking sleeve being gripped tightly in an interior of a respective one of the buoys or floaters.

3. The assembly of buoys or floaters according to claim 2, wherein each of the locking sleeves is divided into two separable semi-sleeves that are mutually symmetrical in relation to a second axial plane P', the semi-sleeves have tightening devices for holding the hitching line by force between the semi-sleeves.

4. The assembly of buoys or floaters according to claim 3, wherein the tightening devices are threaded devices.

5. The assembly of buoys or floaters according to claim 1, wherein the connecting devices comprise at least two clamps spaced apart along the pipe and operable to be maintained secured in the translational sense around the flexible submarine pipe, the hitching line being extended between the clamps.

6. The assembly of buoys or floaters according to claim 1, wherein the first transcurrent hole is a central hole through the buoy or floater.

7. An assembly of buoys or floaters for a flexible submarine pipe, the assembly comprising
   a plurality of buoys or floaters installable one after the other on at least one section of the flexible submarine pipe;
   securing apparatus configured and operable for securing the buoys or floaters in the translational sense on the section of pipe, the securing apparatus comprising
   a hitching line connecting all of the buoys or floaters, the buoys or floaters being secured in the translational sense on the hitching line for maintaining the buoys or floaters in positions one after the other on the hitching line; and
   connecting devices configured for maintaining the hitching line extended along the section of pipe, whereby the buoys or floaters secured on the hitching line are secured in the translational sense in relation to the section of pipe;
   each of the buoys or floaters has a first transcurrent hole therethrough to receive the flexible submarine pipe in a freely sliding manner, and each buoy or floater thereby completely surrounding the pipe;
   the connecting devices comprise at least two clamps spaced apart along the pipe and operable to be maintained secured in the translational sense around the flexible submarine pipe, the hitching line being extended between the clamps.

8. The assembly of buoys or floaters according to claim 7, further comprising a plurality of locking sleeves, each locking sleeve being capable of holding the hitching line, and each locking sleeve being gripped tightly in an interior of a respective one of the buoys or floaters.

9. The assembly of buoys or floaters according to claim 8, wherein each of the buoys or floaters includes a second peripheral transcurrent hole, the hitching line passing through the buoys or floaters via the second peripheral transcurrent holes thereof; and
   each locking sleeve is in one of the second transcurrent holes and secures the respective buoy or floater to the hitching line in the second hole.

10. The assembly of buoys or floaters according to claim 7, wherein the first transcurrent hole is a central hole through the buoy or floater.

* * * * *